United States Patent
Pekarek

[19]

[11] Patent Number: 5,882,085
[45] Date of Patent: Mar. 16, 1999

[54] AUXILIARY DUMP BOX ACCESSORY FOR A FLATBED BALE LOADER

[75] Inventor: Stephen E. Pekarek, Bois D' Arc, Mo.

[73] Assignee: Convert-A-Bed, Inc., Bois D'Arc, Mo.

[21] Appl. No.: 864,013

[22] Filed: May 27, 1997

Related U.S. Application Data

[60] Provisional application No. 60/018,439, May 28, 1996.

[51] Int. Cl.$^6$ ..................................................... B60P 1/00
[52] U.S. Cl. ............................ 298/1 A; 298/10; 414/24.5; 414/812; 296/184
[58] Field of Search ................... 298/1 A, 10; 414/24.5, 414/24.6, 498, 546, 812; 296/184

[56] References Cited

U.S. PATENT DOCUMENTS

| | | | |
|---|---|---|---|
| 3,446,534 | 5/1969 | King ........................................ | 298/1 A |
| 3,630,571 | 12/1971 | Saldana .................................. | 298/1 A |
| 3,820,673 | 6/1974 | McVaugh ............................... | 414/546 |
| 3,833,261 | 9/1974 | Dingler .................................... | 298/1 |
| 3,871,706 | 3/1975 | Odom ........................................ | 298/1 |
| 3,884,526 | 5/1975 | Sweet et al. ........................... | 298/1 |
| 3,915,496 | 10/1975 | Mafbry, Jr. ............................. | 298/1 A |
| 4,522,549 | 6/1985 | Niva ........................................ | 414/498 |
| 4,579,497 | 4/1986 | Nine ........................................ | 414/24.5 |
| 4,594,041 | 6/1986 | Hostetler ............................... | 414/24.5 |
| 4,687,402 | 8/1987 | Zatylny ................................... | 414/24.5 |
| 4,854,807 | 8/1989 | Bishop .................................... | 414/546 |
| 5,383,714 | 1/1995 | Hunter ................................... | 414/24.5 |
| 5,542,808 | 8/1996 | Chiron et al. ........................ | 414/546 |
| 5,662,449 | 9/1997 | Krinhop ................................ | 414/24.5 |

FOREIGN PATENT DOCUMENTS 1032575  6/1978  Canada ................................... 298/1 A

OTHER PUBLICATIONS

Six photographs on two sheets of project of DEW–EZE Manufacturing, Inc., disclosing a cargo box accessory for the DEW–EZE flatbed bale loader, circa 1984.

*Primary Examiner*—David A. Bucci
*Assistant Examiner*—Douglas Hess
*Attorney, Agent, or Firm*—Jonathan A. Bay

[57] ABSTRACT

An auxiliary dump box accessory is provided for combining with a conventional flatbed bale (of hay) loader, for effectively converting the flatbed bale loader and the underlying conventional truck into a dump truck. Thus the dump box accessory gives the flatbed bale loader alternative utility(ies) besides the standard utility of loading and transporting large cylindrical bales of hay, including among others all the utilities typically provided by dump trucks. The dump box rests on the flatbed for use in a conventional upright position. However, when the dump box is unloaded for storage during non-use, it is deposited onto a base support surface such as the ground in a position in which it is substantially inverted.

20 Claims, 5 Drawing Sheets

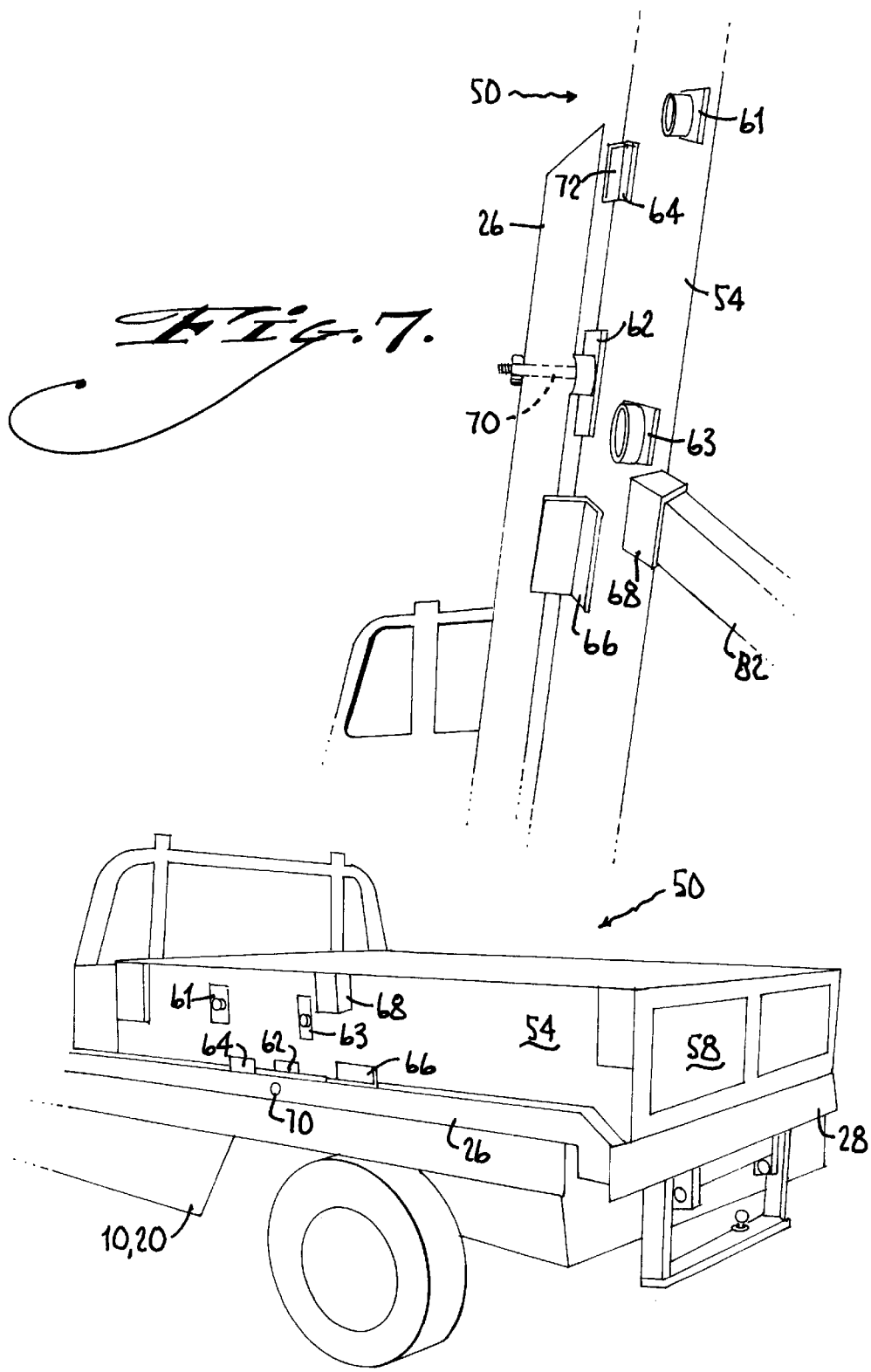

AUXILIARY DUMP BOX ACCESSORY FOR A FLATBED BALE LOADER

CROSS-REFERENCE TO PROVISIONAL APPLICATION

This application claims the benefit of U.S. Provisional Application No. 60/018,439, filed May 28, 1996.

BACKGROUND AND SUMMARY OF THE INVENTION

The invention relates to an auxiliary dump box accessory for a truck configured with a conventional flatbed bale loader.

A given flatbed bale loader typically has two opposed grappling or loader arms mounted at the rear for lifting and loading large cylindrical bales of hay onto the flatbed. The loader arms are generally driven by hydraulics or the like both to and away from each other for grabbing and releasing a given bale of hay. The loader arms are also configured with hydraulic drives for sweeping an overhead arc clockwise or counterclockwise between a storage position in which the arms are docked against the flatbed during non-use, and various extended or use positions during loading and unloading maneuvers.

An auxiliary dump box accessory in accordance with the invention gives a conventional flatbed bale loader an alternative purpose besides its basic bale loading utility, by effectively converting it and the underlying truck into a dump truck. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIGS. 4, 5, 6 and 8 are a sequence of comparable perspective views depicting the auxiliary dump box (as shown by FIG. 3) in various stages of being loaded and set onto the prior art combination truck and flatbed bale loader (which combination is shown by FIG. 1); wherein:

FIG. 4 shows the loader arms in a given extended position in preparation for engaging the auxiliary dump box, which rests on the ground substantially inverted;

FIG. 5 shows the loader arms engaging the auxiliary dump box,

FIG. 6 shows the loader arms lifting the auxiliary dump box, and,

FIG. 8 shows the auxiliary dump box resting upright on the flatbed of the combination truck and flatbed bale loader;

FIG. 7 is a view taken in the direction of arrows VII—VII in FIG. 6;

DETAILED DESCRIPTION OF THE INVENTION

Figure 1:
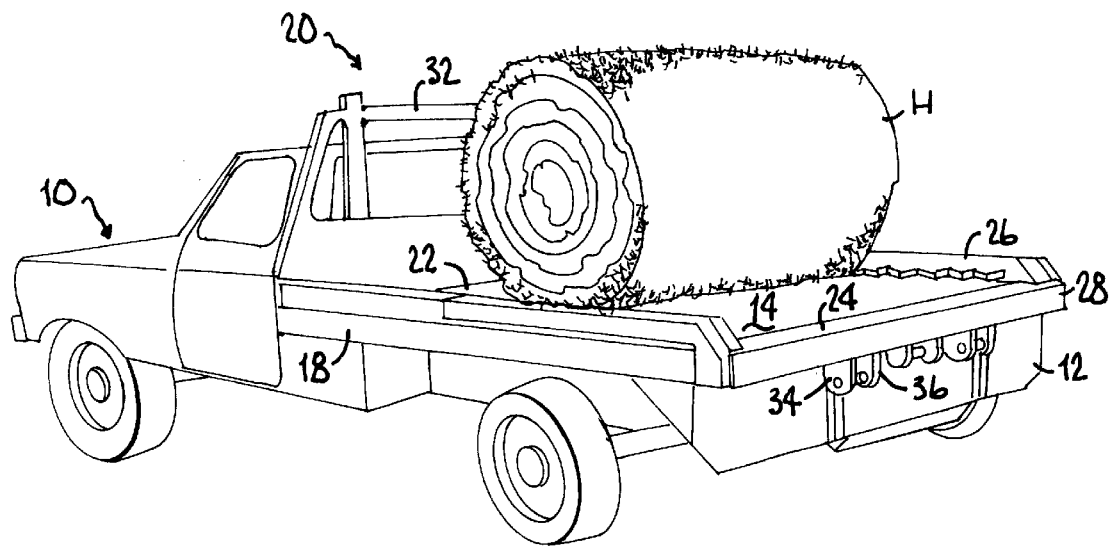
FIG. 1 is a perspective view of a prior art truck combined with a prior art flatbed bale loader, wherein a cylindrical bale of hay is shown loaded upon the flatbed to illustrate the operative use environment therefor.
Figure 2:
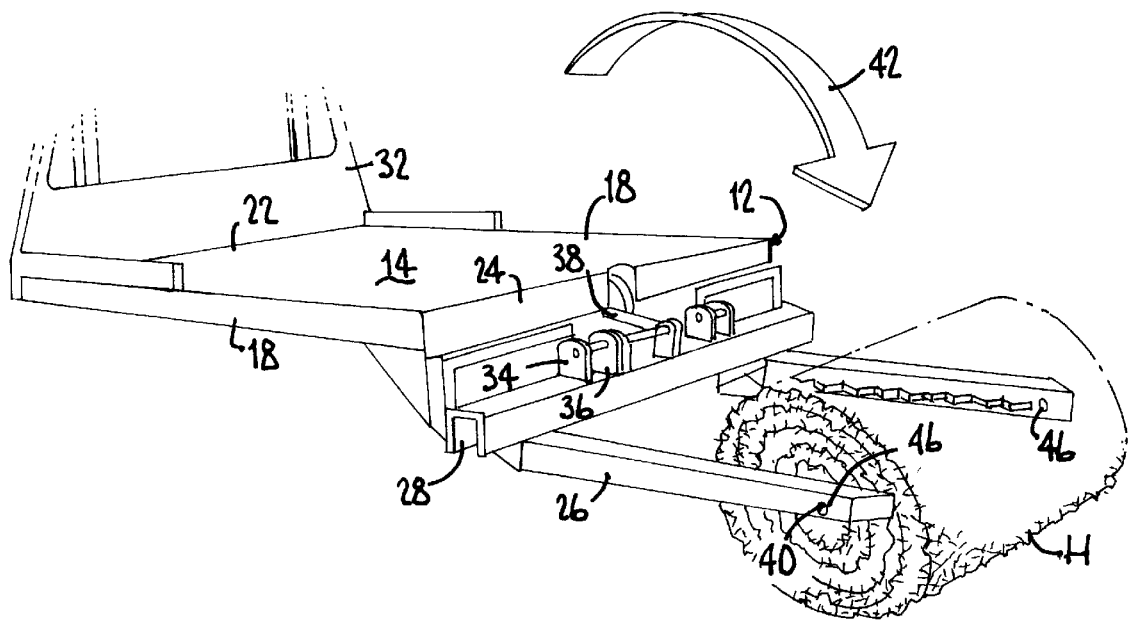
FIG. 2 is a perspective view comparable to FIG. 1, except that the vantage point is slightly different and that the bale of hay is shown deposited on the ground.

With general reference to FIGS. 1 and 2, a prior art truck 10 (FIG. 1 only) is combined with a prior art flatbed bale loader 12 to form a combination 20 which is disclosed and described in U.S. Pat. No. 4,594,041—Hostetler, the disclosure of which is incorporated fully herein by this reference thereto. The underlying truck 10 can be chosen from various suitable commercially-available types because the flatbed bale loader 12 is usually added to a given OEM's truck as an aftermarket modification. The combination truck and flatbed bale loader 20 are, practically speaking, permanently combined as they are not especially configured for ready disassembly, although that would be possible if desired when the effort would justify itself.

The flatbed bale loader 12 comprises a flatbed 14 having spaced side edges 18 extending between front and rear edges 22 and 24, a pair of grappling or loader arms 26, and an arm base 28 interconnecting the loader arms 26 with the flatbed 14. The flatbed 14 provides a planar base or support surface for carrying large cylindrical bales of hay H (see FIG. 1). The flatbed 14 can optionally be abutted against a front wall 32 which acts to protect the truck 10's cab from damage from shifting loads on the flatbed 14 including, especially, shifting bales of hay.

The flatbed 14's rear edge 24 is configured with a set of brackets 34 to which the arm base 28 is pivotally coupled sets of brackets 36 on the arm base 28. The arm base 28 generally comprises a metal channel which, in FIG. 1, is shown positioned in a U-shaped orientation, and in FIG. 2 in an inverted-U orientation. The brackets 36 of the arm base 28 are attached to the web portion of this channel. The arm base 28 is pivotally driven between its clockwise and counter clockwise extremes by a hydraulic cylinder (not shown) which is mounted underneath the flatbed 14, hidden from view in the drawings. The hydraulic cylinder drives its corresponding piston rod (38 in FIG. 2) between an extreme retracted position, which places the loader arms 26 in the retracted or non-use position represented by FIG. 1, and various extended positions that give the arm base 28 its pivotal motion and thereby sweep the arms 26 through a given overhead arc that is indicated by reference numeral 42 in FIG. 2.

The loader arms 26 are movably mounted on the arm base 28 in such various arrangements that allow the loader arms 26 to rest against and compress therebetween the bale of hay H in order to lift and carry it, or deposit on the flatbed as shown in FIG. 1. The arrangement of the loader arms 26 shown in the drawings is representative of the DEW-EZE™ brand flatbed bale loader, which is disclosed by the previously referenced U.S. Pat. No. 4,594,041. However, other brands are available including without limitation the HYRDRA-BED™ brand flatbed bale loader, portions of which are disclosed by U.S. Pat. No. 4,564,325, or the flatbed bale loader of Besler Industries, Inc. of Nebraska, and so on. In these other types of flatbed bale loaders, the arms are pivotal to and away from each other like pinchers of a lobster claw.

As shown in the drawings, the loader arms 26 are driven to move laterally in and out relative to the brackets 36 on the arm base 28. In this given arrangement, the loader arms 26 maintain a relatively parallel relationship with each other as they are driven either to foreshorten in towards or extend out away from each other. The loader arms 26 are driven by one or more hydraulic cylinders (not shown) mounted in the channel of the arm base 28, as more particularly described in the above-incorporated U.S. Pat. No. 4,594,041—Hostetler.

The flatbed bale loader 12 of FIGS. 1 and 2 is advantageous for handling and transporting large cylindrical bales of hay H as these types of bales of hay have become more popular over the more traditional, small rectangular bales. One feature of the flatbed bale loader 12 is its ability to deposit a given, large cylindrical bale in a feedlot and then, by dragging the bale across the ground, allow the spirally wound web of the hay to unwind in the feed lot or pasture to leave hay extended out in a strip rather than dumped in a pile. It has been found that if a large cylindrical bale of hay is dumped in a pile, the feeding livestock tend to score or scar the ground deeply with their hooves while feeding for an extended period of time at the pile. After the ground has been scored or scarred like that, the ground does not quickly recover to allow vegetation to grow back and heal that spot in the next growing season. If, however, the bale is unwound to allow the hay to extend or stretch out over a relatively long strip, then this tends to distribute the damage done to the ground by the livestock's hooves and thus lessens the detrimental impact caused to the pasture or feed lot. Under normal conditions, vegetation can typically return to that spot in the next growing season.

In order to achieve that result, the loader arms 26 are configured with one or more sets of hub fixtures 46 in which can be removably inserted and mounted spikes or spinner plates (neither shown) which in turn can be inserted in or abutted against a given cylindrical bale of hay H at approximately the cylindrical axis of symmetry thereof.

The prior art combination 20 truck and flatbed bale loader 12 have limited utility when not used for bale loading and transporting purposes because of the absence of a meaningful container means to haul and dump cargo. An auxiliary dump box accessory in accordance with the invention overcomes these shortcomings by effectively converting the prior art combination 20 truck 10 and loader 12 into a dump truck, and which provides all the typical advantages and uses that a pick-up truck gives a user in the competitive business of farming; such as cargo hauling and the like, as well as including the bonus option of use for cargo dumping.

Figure 3:
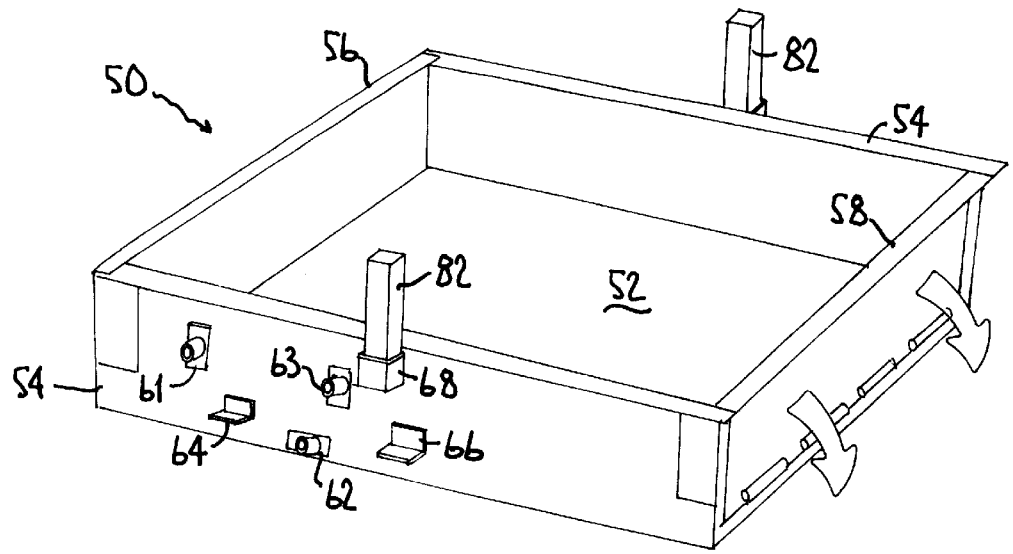
FIG. 3 is a perspective view of an auxiliary dump box in accordance with the invention.

FIG. 3 shows such an auxiliary dump box accessory 50 in accordance with the invention. It comprises a bed 52 extending laterally between spaced side walls 54 and, in the front to rear direction, between a front wall 56 and a rear tailgate 58 (e.g., like a pick-up truck tailgate). The mounting of the tailgate 58 can be configured in various arrangements, including, without limitation, as is shown in the drawings.

Each sidewall 54 includes three like mounting sockets 61–63. The three sockets 61–63 comprise a main socket 62 and two special purpose sockets 61 and 63, whose purpose will be more fully explained below. The sockets are alike in comprising a cup-like structure welded to a planar base which has tabs for bolt holes for bolting the sockets 61–63 in place on the sidewall 54. Each sidewall 54 also includes two stop brackets 64 and 66 arranged to flank the main socket 62, and various stake pockets including a central stake pocket 68 which extends only a portion of the way down from the upper edge of the sidewall 54. The dump box 50 can be formed from any suitable material including twelve gauge sheet metal reinforced with quarter-inch (6 mm) thick plate in the areas that carry the mounting sockets.

Figure 4:
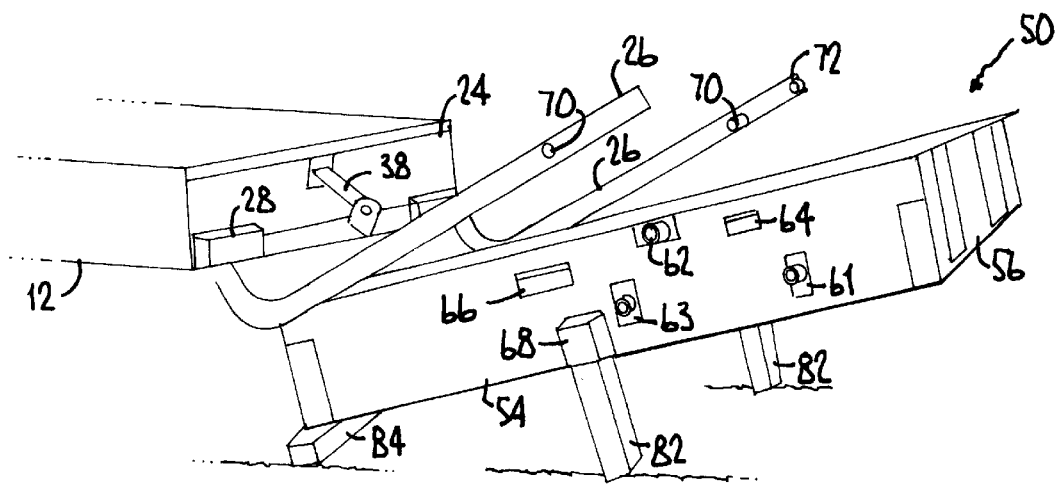

FIGS. 4, 5, 6 and 8 give a sequence of views which show how the auxiliary dump box accessory 50 is lifted by and loaded onto the flatbed bale loader 12 for use. FIG. 4 shows the start of the procedure.

The auxiliary dump box accessory 50 rests on the ground in a generally inverted position, as propped up in the inclined angle shown in FIG. 4, by a wooden stake 82 in the central stake pocket 68. The upper edge of the tailgate 58 (which upper edge, as shown in FIG. 4, is oriented down) is propped or shimmed up by a wooden beam 84 to elevate it slightly off the ground by some given distance. Trial and error with the sizes of the stakes and shims 82 and 84 will allow a user to align the dump box 50 correctly for any commercial bale loader. The truck 10 (out of view) has been reversed or backed up to a given parked position to orient the arm base 28 in a given alignment with the dump box tailgate 58 as shown in FIG. 4. The loader arms 26 are pivoted to the extended position shown in FIG. 4 in preparation for the loader arms 26 to engage the auxiliary dump box accessory 50.

Figure 5:
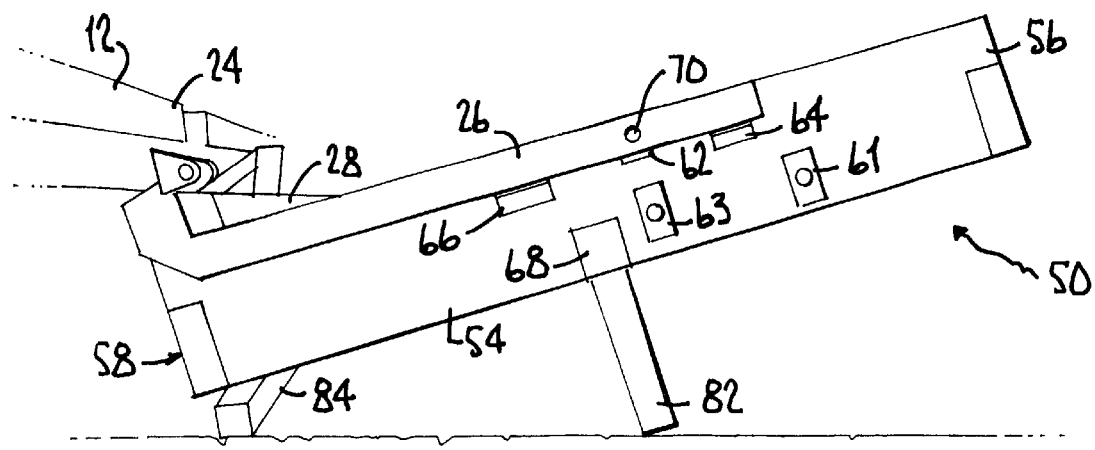

In FIG. 5, the position of the loader arms 26 is changed such that the arms 26 generally rest against the sidewalls 54 of the dump box 50 along the lower edge thereof (which because of the inverted position of the dump box 50 is the upper edge in the view of the FIG. 5). The loader arms 26 carry a spike or pin (not in view, but see FIG. 7) for insertion into the main socket 62. To change the loader arms 26 from the position shown in FIG. 4 to that shown in FIG. 5, the user has actuated the hydraulic drive that controls the loader arms 26 and pivoted them further clockwise relative to FIG. 4, and also actuated the transverse cylinders in the arm base 28 to foreshorten the gap between the arms 26, and thus compress the arms 26 against the dump box 50. Thus FIG. 5 shows the completion of the process of the arms 26 engaging the dump box 50.

Figure 6:
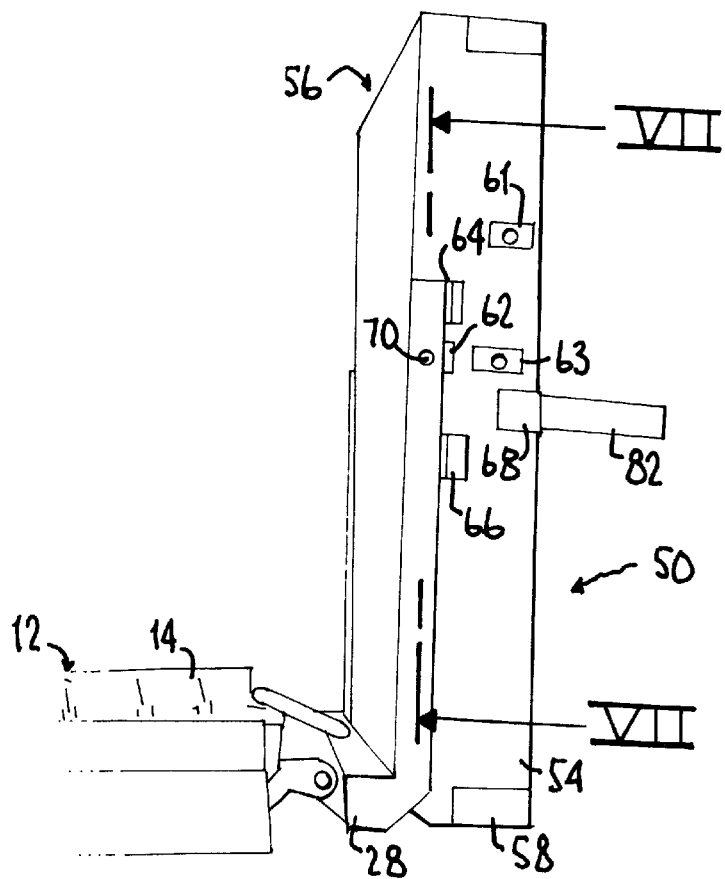

FIGS. 6 and 8 show the loading of the dump box 50 onto the flatbed 14. In FIG. 6, the dump box 50 is shown lifted up with the tailgate section oriented straight down. In FIG. 8, the dump box accessory 50 is shown resting on the flatbed 14 of the loader 12 to define a cargo box for hauling spreadable as are typical around a farm including without limitation gravel, feed, manure, fertilizer and so on.

An inventive aspect of the dump box 50 includes that it is loaded onto the flat bed 14 from an inverted position which is shown by FIG. 5. In order to accomplish this inventive aspect, the dump box 50 allows engagement by the loader arms 26 such that relative rotation between the loader arms 26 and dump box 50 is generally prevented. FIG. 7 shows one means devised for this purpose of limiting relative rotation between the loader arms 26 and dump box 50.

The accessory in accordance with the invention includes a main pin or insertion structure 70 which as shown by FIG. 7 is inserted into the main socket 62. The main pin 70 has a threaded base on which a nut is tightened for securing it to the loader arm 26. The engagement between the pin 70 and socket 62 is the main weight-supporting connection between the loader arms 26 and dump box 50. The spaced brackets 64 and 66 act as stop surfaces for abutting against the loader arm 26 to limit relative rotation. The bracket 64 is a portion of angle iron welded to the sidewall 54 and includes a flange to abut against minor pin 72. Alternatively or in addition thereto, the other bracket 66 is also an angle iron weldment which includes a flange to abut against the arm proper of the loader arm 26 at a location spaced apart from the engagement between the main pin and socket 70 and 62.

Figure 9:
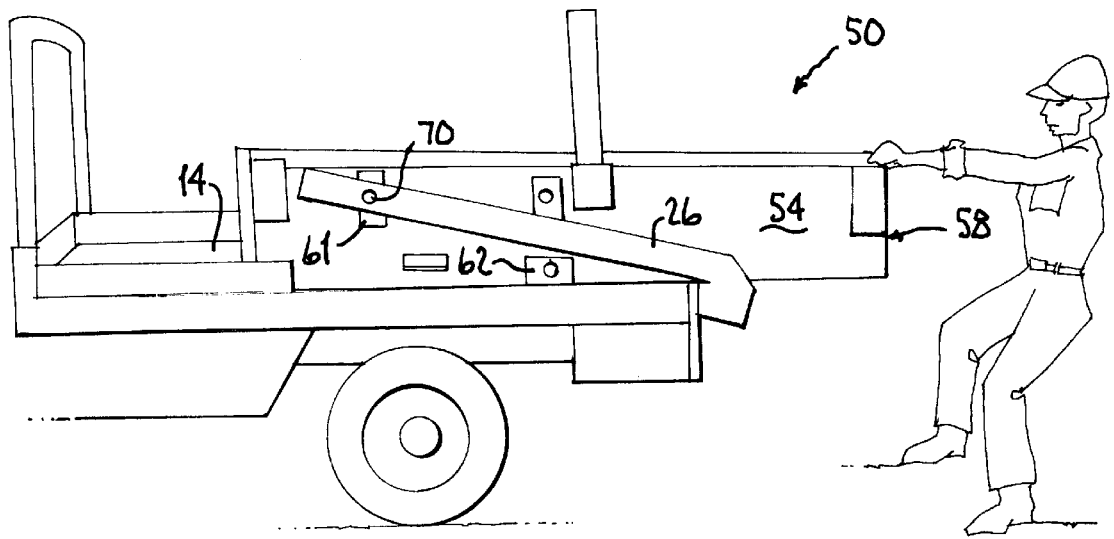
FIG. 9 is a perspective view of the loader arms disengaged from the auxiliary dump box and a user manually sliding the dump box rearwardly on the flatbed; and, FIG. 10 is a perspective view comparable to FIG. 9 except showing the loader arms in an alternative engagement with the dump box for increased leverage in dumping, wherein the dump box is shown tipped up as if dumping.
Figure 10:
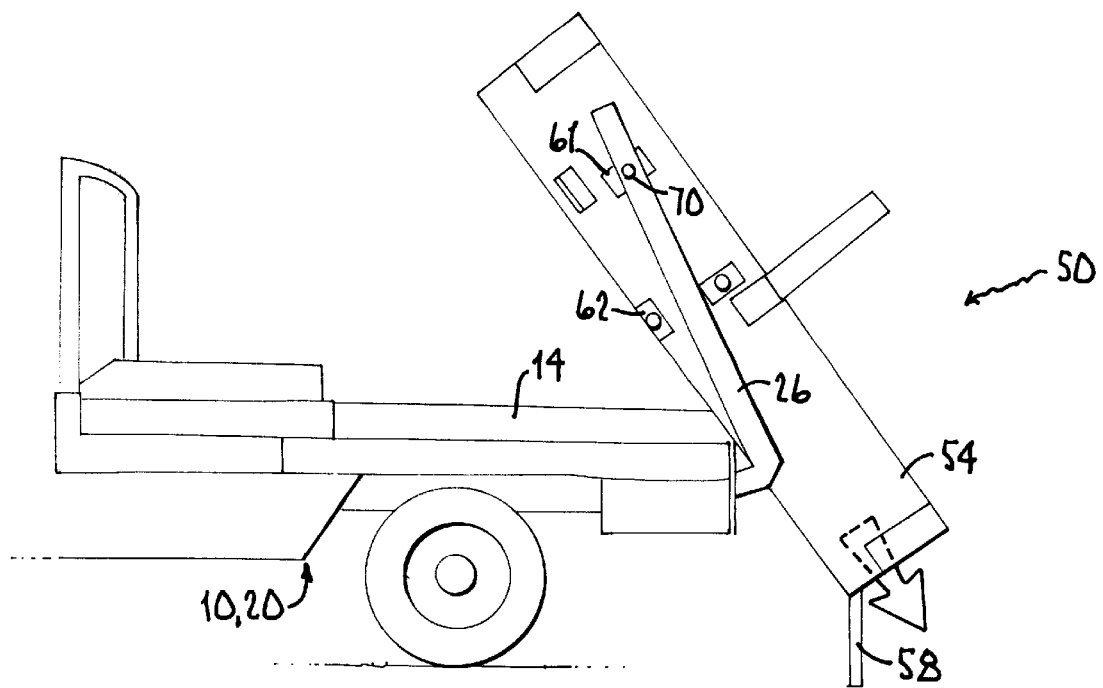

FIGS. 9 and 10 show an alternative arrangement of how the loader arms 26 would preferably be arranged to grab the dump box 50 as more appropriate for hauling and dumping loads of heavy material such as rocks or gravel and the like (not shown). The engagement of the main pin 70 is moved out the main socket 62 and in inserted instead into one or another of the special purpose sockets 61 or 63. Changing out the pin 70 from socket 62 and into socket 61 moves the weight-supporting contact on the dump box 50 by approximately two-feet (0.6 m) forward and one-foot (0.3 m) up. As a result the rear tailgate 58 of the dump box accessory 50 overhangs the rear edge 24 of the flatbed 14 by about the same two feet (0.6 m) or so.

The purpose behind this re-alignment of the loader arms 26 on the dump box accessory 50 is to shift the center of mass of a heavy load—such as gravel (not shown)—further rearwardly relative to the pivot axis of the arm base 28 because, less power is required from the hydraulic cylinder (s) (not shown) that powers the loader arms 26 to dump and unload the gravel or the like. In fact, the standard hydraulic cylinder that is commercially available with the DEW-EZE™ flatbed bale loader is underpowered for dumping a full load of gravel. Unless, that is, the dump box accessory 50 is arranged on the loader arms 26 as shown by FIG. 10.

In FIG. 9 the loader arms have been extended away from each other such that the main pin 70 clears the sockets 62 and/or 61 (this clearance is not shown) while a user slides the dump box 50 rearwardly on the flatbed 14. The user then drives the loader arms 26 so that the main pin 70 inserts in and compresses against the special purpose socket 61. Accordingly, the loader arms 26 are given increased leverage for dumping the dump box 50 as shown by FIG. 10.

The sockets 61–63 have been arranged onto the sidewalls 54 in particular adaptation for the DEW-EZE™ brand flatbed bale loader. However, with minimal trial and error, the sockets 61–63 could be relocated on the sidewalls by mounting hardware such as nuts and bolts (not shown) for adaptation for use with flatbed bale loaders of other brands too.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An accessory for a flatbed bale loader of the type having opposed loader arms for resting against the sides of a cylindrical bale of hay, these arms being coupled to a mechanically-powered arm base and are operative to compress against the sides of the bale and rotate in overhead arcs to lift the bale off the ground or flatbed and correspondingly deposit it onto the flatbed or ground, respectively; said accessory comprising:

an auxiliary dump box having a bottom wall supporting a front wall between spaced sidewalls that have portions against which the loader arms can rest;

arm-modification means for removably attaching to each of the loader arms and thereafter for forming a weight-supporting connection between the loader arms and the dump box;

recipient means on the sidewalls for removably receiving the arm-modification means; and, stop means on the sidewalls for limiting relative rotation between the dump box and the loader arms such that the dump box is lifted off the ground from, and deposited back onto the ground in, an inverted position in order that the dump box properly rests upright on the flatbed during use.

2. The accessory of claim 1 wherein:

the arm-modification means comprises a pair of opposing pins mountable to the respective opposing loader arms.

3. The accessory of claim 2 wherein:

the recipient means comprises a cup-like structure mounted in such an orientation on the dump box to allow a pin and socket connection between the cup-like structure and the arm-modification means.

4. The accessory of claim 1 wherein:

the stop means comprises an abutment surface to abut against the loader arm at a position spaced from the mounting on the loader arm of the arm-modification means.

5. The accessory of claim 1 wherein:

the stop means is shaped and arranged for limiting relative rotation between the loader arms and dump box to the point that relative rotation is not present.

6. The accessory of claim 1, further comprising a plurality of recipient means to allow alternative connective arrangements between the loader arms and the dump box in order to accomplish improved leverage for the loader arms to tip up the dump box for dumping loads.

7. The accessory of claim 1, further comprising a rear wall spaced from the front wall and extending between the sidewalls.

8. The accessory of claim 1 wherein:

the rear wall is attached to pivot and one of drop as a tailgate or rotate up as a dump truck gate.

9. A method of loading a removable dump box accessory onto a flat bed bale loader, comprising the steps of:

providing a flatbed bale loader that has opposed loader arms for resting against the sides of a cylindrical bale of hay, which arms are coupled to a mechanically-powered arm base and are operative to compress against the sides of the bale and rotate in overhead arcs to lift the bale off the ground or flatbed and correspondingly deposit it onto the flatbed or ground, respectively;

providing a dump box accessory that includes a bottom wall supporting a front wall between spaced sidewalls against which the loader arms can rest;

storing the dump box accessory during periods of non-use on a base support surface in a substantially inverted position;

maneuvering the loader arms against portions of the sidewalls of the inverted dump box accessory and compressing the loader arms thereagainst for lifting the weight of the dump box accessory;

rotating the loader arms to lift the dump box accessory in an overhead arc and deposit it upright on the flatbed; and, during the step of rotating the loader arms to lift the dump box accessory, preventing relative rotation between the loader arms and the dump box accessory.

10. The method of claim 9, wherein the step of preventing relative rotation between the loader arms and the dump box accessory further includes:

preventing relative rotation between the loader arms and the dump box accessory to the point that relative rotation is not present.

11. The method of claim 9, wherein the base support surface includes the ground.

12. The method of claim 9, further for off-loading the dump accessory, comprising the further steps of:

rotating the loader arms to lift the dump box accessory from its upright at-rest position on the flatbed, through an overhead arc, and deposit it on the base support surface in an inverted position; and, during the last-recited step, preventing relative rotation between the loader arms and the dump box accessory.

13. An accessory for a flatbed bale loader of the type having opposed loader arms for resting against the sides of a cylindrical bale of hay, which arms are coupled to a mechanically-powered arm base and are operative to compress against the sides of the bale and rotate in overhead arcs to lift the bale off the ground or flatbed and correspondingly deposit it onto the flatbed or ground, respectively; said accessory comprising:

an auxiliary dump box having a bottom wall supporting a front wall between spaced sidewalls that have portions against which the loader arms can rest;

weight-supporting means on opposite sides of the dump box on portions of the sidewalls, for forming a weight-supporting engagement between the loader arms and the dump box; and, stop means on the sidewalls for limiting relative rotation between the dump box and the loader arms such that the dump box is lifted off the ground from, and deposited back onto the ground in, an inverted position, in order that the dump box properly rests on the flatbed during use in an upright position.

14. The accessory of claim 13 wherein:

the weight-supporting means comprises opposite cup-like structures mounted on opposite sides of the dump box on portions of the sidewalls, for engagement by insertion structures and thereby allow a pin and socket connection between said cup-like structures and the loader arms.

15. The accessory of claim 13 wherein:

the stop means comprises an abutment surface to abut against the loader arm at a position spaced from where the loader arm engages the weight-supporting means.

16. The accessory of claim 13 wherein:

the stop means is shaped and arranged to limit relative rotation between the loader arms and dump box to the point that relative rotation is not present.

17. The accessory of claim 13, further comprising a plurality of weight-supporting means to allow alternative engagement arrangements between the loader arms and the dump box in order to accomplish improved leverage for the loader arms to tip up the dump box for dumping loads.

18. The accessory of claim 13, further comprising a rear wall spaced from the front wall and extending between the sidewalls.

19. The accessory of claim 18 wherein:

the rear wall is attached to pivot and drop as a tailgate.

20. The accessory of claim 18 wherein:

the rear wall is attached to pivot and one of drop as a tailgate or rotate up as a dump truck gate.

* * * * *